United States Patent [19]

Harper et al.

[11] 4,182,594
[45] Jan. 8, 1980

[54] WIND DRIVEN ENERGY SYSTEM

[76] Inventors: George W. Harper, 11508 S. I St., Tacoma, Wash. 98444; Walter E. Currah, Jr., 4401 S. 64th St., Tacoma, Wash. 98409

[21] Appl. No.: 727,347

[22] Filed: Sep. 28, 1976

[51] Int. Cl.² ............................................. F03D 1/04
[52] U.S. Cl. ........................................ 415/2; 415/208
[58] Field of Search .................................. 415/2–4, 415/208, DIG. 8

[56] References Cited

U.S. PATENT DOCUMENTS

| 984,599 | 2/1911 | Pichault | 290/55 |
| 1,345,022 | 6/1920 | Oliver | 415/3 |
| 2,330,907 | 10/1943 | Odor et al. | 415/208 |
| 2,563,279 | 8/1957 | Rushing | 415/3 |
| 3,740,565 | 6/1973 | Wesley | 290/55 |
| 4,017,204 | 4/1977 | Sellman | 415/2 |

FOREIGN PATENT DOCUMENTS

| 546417 | 8/1922 | France | 415/2 |
| 735040 | 11/1932 | France | 415/2 |
| 989170 | 2/1944 | France | 290/55 |
| 1011132 | 6/1952 | France | 415/4 |
| 1041534 | 10/1953 | France | 415/2 |
| 1098995 | 4/1955 | France | 415/2 |

Primary Examiner—Everette A. Powell, Jr.
Attorney, Agent, or Firm—Kenneth S. Kessler

[57] ABSTRACT

A system for conversion of wind power to electrical energy. The system provides for use during a wide range of wind velocities by use of the following: an external deflection system consisting of baffles and peripheral turbulence creating walls designed to increase the wind velocity and to divert the wind stream to the aperture of the system; a chamber for the collection and compression of the wind thereby further increasing the wind velocity if necessary; a deflection system for diverting wind from the chamber in high winds; a rigid circumferential tip face at the fan circumference whereby the fan blades fit into the tip race for support; a center deflector to divert the wind force to the fan blade tips; a tip-mounted generating system utilizing induction fields to obtain electrical energy and a system to vary the strength of the induction field so a constant blade speed may be obtained over a range of wind speeds and conditions.

6 Claims, 7 Drawing Figures

WIND DRIVEN ENERGY SYSTEM

BACKGROUND OF THE INVENTION

Windmills have provided useful power for at least 600 years. However, utilization of wind energy in the United States and elsewhere has declined. The problem with utilization of wind energy is the vast disparity of wind velocities which will confront a wind energy system.

The power of wind varies as the cube of the velocity. There are relatively few areas in the United States where the wind routinely exceeds 10 m.p.h. Thus, without an efficient means to increase the velocity of the wind ultimately hitting the fan blades, a wind system is not practical.

In the locations where wind strength does routinely exceed 10 m.p.h. it is found that the winds in these locations occasionally are excessive. Any system which is designed to make use of average winds must also be capable of withstanding extreme high speed winds.

As set forth above, wind power varies with the cube of the velocity. Also, force exerted on a fan blade at a greater distance from the pivot produces more energy. Thus, the greater the velocity at the greater the distance from the pivot, the greater the energy produced. However, when wind reaches a high speed, excessive lateral distortion is experienced at the fan blade tips as well as excessive tip speed from the high rotational torque.

Prior inventions have addressed the problem of concentrating wind energy. U.S. Pat. No. 3,883,570 by Uzzel, Jr. and German Pat. No. 605377 use a Venturishaped chamber which is opened at opposite ends. Venturi-shaped funnels concentrate the wind into the fan which is placed in the chamber. English Pat. No. 2,999 and U.S. Pat. No. 3,878,913 both use a conicle deflector to use wind to the outer portions of the fan blades. However, the above stated patents do not use exteriorally position devices to compress the wind into conical chamber nor do the patents provide for a conical deflector within the chamber whose configuration prevents the backup of air at the fan blades.

German Pat. No. 371,458 and English Pat. No. 507,555 show a tip generation system for the production of energy. The inventors in the above two patents did not seem to use the circumferential production of energy for support of the fan blades about the circumference of the fan. English Pat. No. 507,555 has a generator element located either in front or behind the blades with the blades brushing the poles, differing from this system where at some point the blades are in continuous contact with the circumferential member. The two systems described in German Pat. No. 371,459 and English Pat. No. 507,555 lack the ability to function under very high winds due to the pressure and distortion experienced at the circumference of fan blades which do not have support.

The system needed for development of wind power is a system which can handle extremely high variations of wind velocity and still produce a fairly constant output of power.

SUMMARY OF THE INVENTION

The difficulty in using wind powered systems for producing electrical energy is in consistently producing a given power level for wide ranging wind variations. The system set forth herein, has provisions for all the variable wind velocities.

For periods of low velocity wind the system employs ways of compressing and increasing the wind velocity. A group of baffles and peripheral turbulence creating walls are set up to divert and shape the wind stream to the aperture of the wind chamber. The wind chamber itself is designed to compress and speed the effective velocity of the wind. Inside the chamber, wind is diverted to the outer diameter of the fan blade. Two fans are employed with proper design and placement to better utilize the wind power.

For high winds which will potentially damage the system, diversions of the wind are employed. A ground diversion wall is placed in front of the chamber which may be raised thereby deflecting wind over the top of the wind chamber. The baffles and peripheral turbulence creating walls are also movable in order to allow deflection of the wind stream.

In addition, the fan blades are given added support to withstand higher velocity wind. The tips of the blade arms are placed in a circumferential tip race thereby supporting the blade on an outer bearing surface as well as the hub, thereby helping prevent warping and flutter and further decreasing metal fatigue in the fan blade arms. The system also provides for tip generation.

The above system both protects the installation in potentially hazardous wind and allows the system to produce energy in periods of low wind.

DETAILED DESCRIPTION OF THE DRAWINGS

Figure 1:
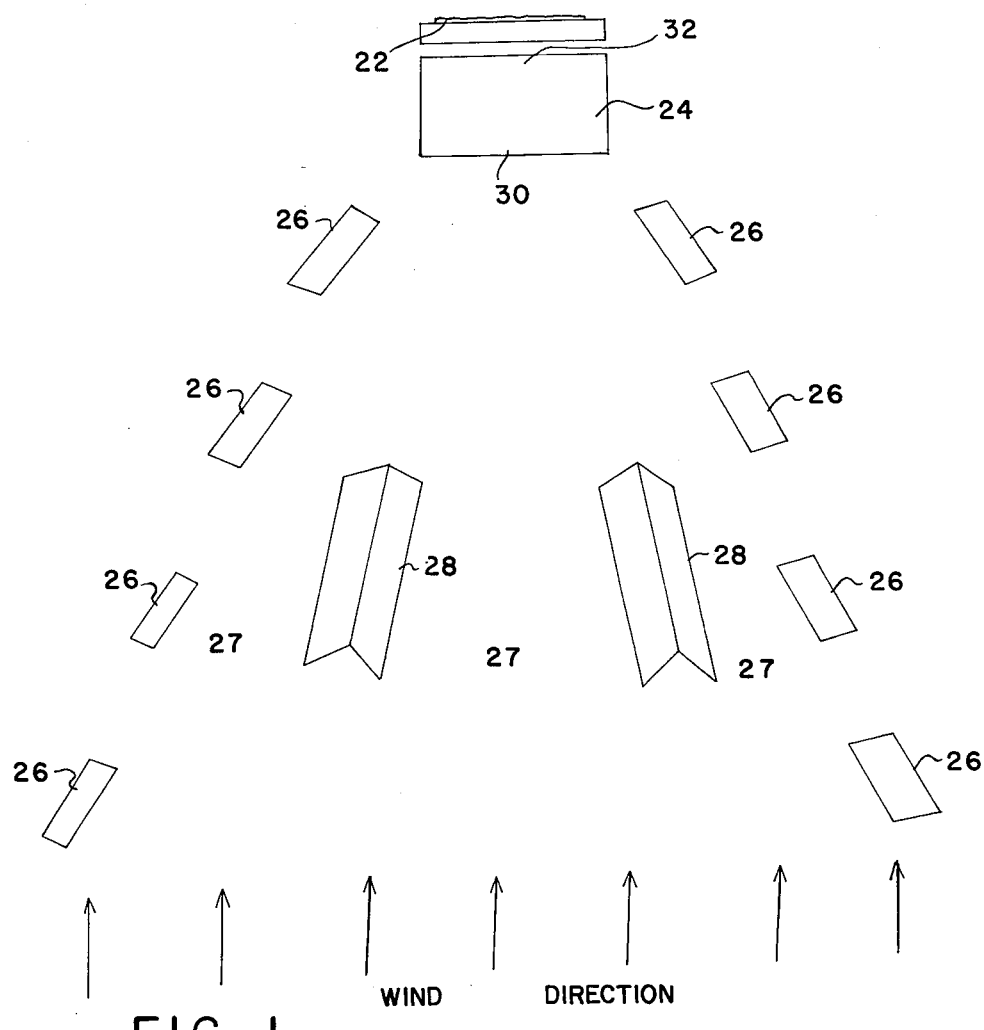
FIG. 1 is a diagramatic view showing the positioning of the baffles and ground diversion wall in relation to the wind chamber.

In FIG. 1 the wind power system 20 is shown in an overhead view to show the relative positioning of its components. Baffles 26 are placed in the front of the wind chamber 22. The baffles are placed in a configuration which will shape and speed the wind toward the aperture 42 of the wind chamber 22. Baffles 28 are of the same configuration as baffles 26 but are placed back to back and also shape and speed the wind to the aperture of the wind chamber 22. A ground diversion wall 24 is placed in front of the wind chamber 22. The ground diversion wall 24 is movable such that the front end of the wall 30 is permanently affixed to the ground and the back edge of the wall 32 is movable such that it may rise to divert wind over the top of the wind chamber 22. At an extreme, the ground wall 24 will cause all wind to be diverted over the top of the aperture 42 of the wind chamber 22.

Figure 2:
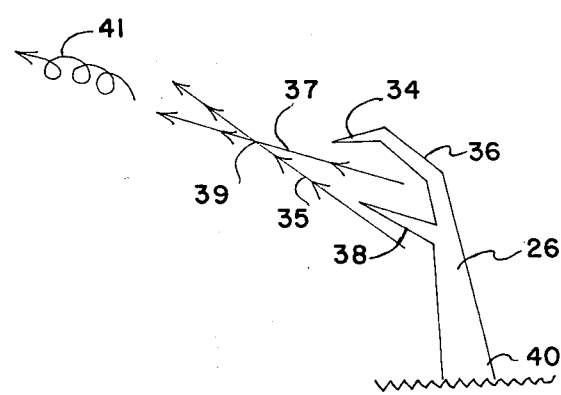
FIG. 2 is a side view of the baffles and a schematic of the turbulence created by the baffles.

FIG. 2 is a side view of the baffle 26. The base 40 of the baffle 26 is affixed to the ground thereby making the wind direction perpendicular to the side view of the baffle 26 as shown. The baffle 26 is designed to produce turbulence zones, similar in type to Komolgorov turbulances. The lower baffle arm 38 is shorter than the combined upper arm 36 and the final deflection angle of the upper arm 34 of the baffle, and projects wind at a distinctly higher angle.

Wind being directed by walls such as baffles 26 tends to rise. The lower baffle arm 38 and the upper baffle arm 36 and the final deflection angle of the upper arm 34 give another direction to the rising, incoming wind. The change of course brought about by the two baffle arms, 38 and 36 is depicted in vectors 35 and 37. Lower baffle arm 38 causes a deflection in rising air as depicted by vector 35. Upper baffle arm 36 and final deflection angle of the upper arm 34 cause a deflection in rising air as depicted by vector 37. Since the air represented by vector 35 rises at a faster rate than the air depicted by vector 37, the rising air converges at point 39, thereby producing turbulence 41. The turbulence 41 is created by each baffle 26 creating a turbulence barrier over the approach region 27 between the baffle walls 26 in front of wind chamber 22. Incoming wind 21 seeking to rise from the approach region 27 is restricted by overhead turbulence 41 thereby retarding the escape of rising air causing a higher percentage of incoming wind 21 to reach wind chamber 22.

The baffles 26 are positioned at angles which channel incoming wind 21 towards the wind chamber 22. The angle of baffles 26 are in positions such that if incoming wind 21 does not approach wind chamber 22 at right angles, the wind is nevertheless channeled towards wind chamber 22.

Baffles 26 are also useful in different angled winds. Baffles 26 are fixed. Baffles 28 are movable to different angles.

Figure 3:
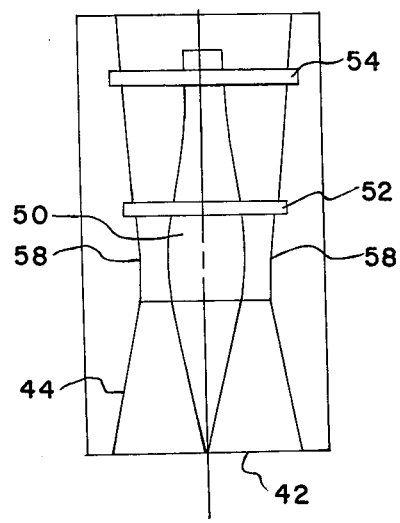
FIG. 3 is a frontal view of the system showing the positioning of the baffles, and the ground diversion wall in relation to the wind chamber.

FIG. 3 is a front view of the power system 20. In the front view of the system 20 the position of the aperture 42 is shown in relation to the baffles 26. Also, the ground diversion wall 24 is shown in raised position thereby deflecting a percentage of the wind over the top of the aperture 42.

Figure 4:
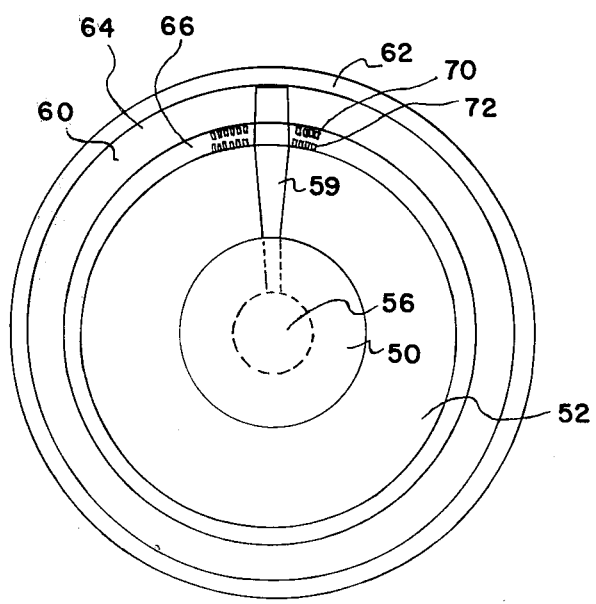
FIG. 4 is a side view of the wind chamber.
Figure 5:
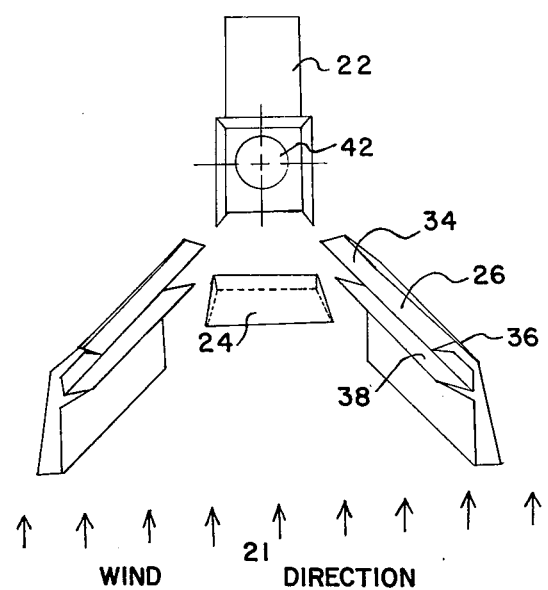
FIG. 5 is an overhead view of a cutaway portion of the wind chamber.

As shown in FIGS. 4 and 5, the wind chamber 22 depicted in the preferred embodiment takes the form of a modified venturi wall configuration 44 thereby compressing and increasing the velocity of the incoming wind. The modified venturi wall configuration 44 is secured to the wind chamber 22 by holding rods 45. The modified venturi wall configuration 44 narrows until a point 46 is reached whereupon it widens until it reached the first fan 52. The widening of the modified venturi wall configuration 44 from point 46 prevents the stacking up of incoming air in front of the first fan 52. Although a modified venturi wall configuration 44 is shown in the preferred embodiment other conical wall configurations will work. Two fan-shaped windwheel, 52 and 54 are positioned within the modified venturi wall configuration 44. Also, inside the venturi wall configuration 44 is a conical deflector 50 which channels the wind away from the hub of the fan blades 59 to the outer areas of the blades 59. The percentage of wind which strikes the outer portion of the blade 59 is more efficient than the percentage of wind which would strike the blade near the hub 56.

FIG. 4 shows a side view of the wind chamber 22 showing the relative positions of the conical deflector 50 and front and back fan-shaped windwheels, 52 and 54.

FIG. 5 is an overhead view of a cutaway portion of the wind chamber 22. Wind currents moving in at the aperture 42 are diverted by the conical deflector 50. The conical deflector progressively widens until the point of maxium air constriction is reached at point 58 which is at the throat of the venturi wall configuration 44.

The conical deflector 50 continues in the interval between the first fan 52 and second fan 54 by continuing to narrow thereby preventing back pressure against first fan 52.

Figure 6:
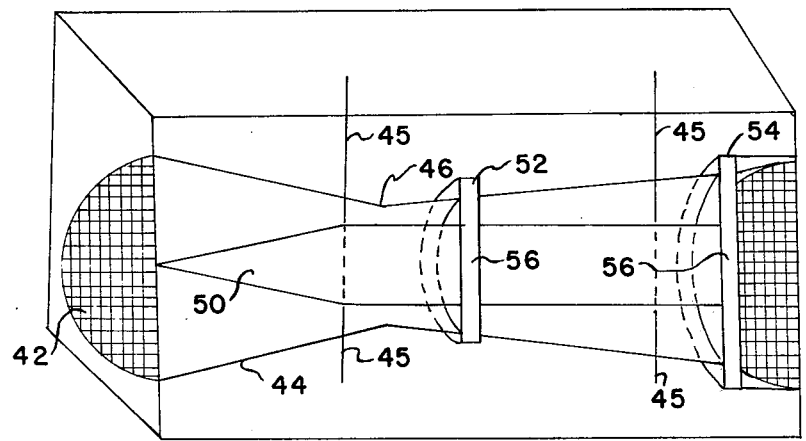
FIG. 6 is a front view of the fan showing only one blade.

FIG. 6 is a front view of the fan 52. Although the circumference of fan 52 and fan 54 may vary, the basic configuration of the two fans in the preferred embodiment is identical. The fan shown in FIG. 6, for simplicity, has shown only one fan blade 58, the fan may have a multiplicity of fan blades 59. In high winds the baldes 59 may vary their pitch, thereby permitting the blades to be feathered. The fan blades 59 are rotated about hub 56. The outer edge of the fan blades 59 are supported by the fan circumference 60.

Fan circumference 60 is affixed to the modified venturi wall configuration 44 by holding rods 45. The outer face of the upper ring 62 of the fan circumference 60 is roughly flush with the windward portion of the fan blade 59. The fan circumference 60 has two recessed channels 64 and 66 which run the entire circumference of the fan circumference 60. Channel 64 is the first recessed channel below the upper ring 62. Immediately below channel 64 is channel 66. Channels 64 and 66 are of approximately the same width. Between channel 64 and recessed channel 66 is interface 68. Affixed to interface 68 are roller bearings 70. As shown in FIG. 6, roller bearings 70 are evenly spaced throughout the circumferential distance of the interface 68. Affixed to channel 66 are roller bearings 72. The roller bearings 72 are evenly spaced throughout the circumferential distance of channel 66.

Fan blade 59 is notched so that the upper portion of the fan blade conforms to the channels 64 and 66. When the fan blade 59 rotates about the hub 56, the upper portion of fan blade 59 is given support in two directions. The force of incoming wind 21 on fan blade 59 is counteracted by support in the fan circumference through channel 66 and affixed roller bearings 72. Any lengthening of fan blade 59 is controlled by support from interface 68 and affixed roller bearings 70. The preferred embodiment in regard to channels 64 and 66, may be modified to different track-like configurations for support of the outer portions of fan blade 59. Channels 64 and 66 are attached to the inner venturi wall configuration 44.

Also affixed to the fan blades 59 are rotors 74. Affixed to the circumference of the fan are stators 76. The rotating of the fan blades 59 thereby are capable of producing electrical energy.

Figure 7:
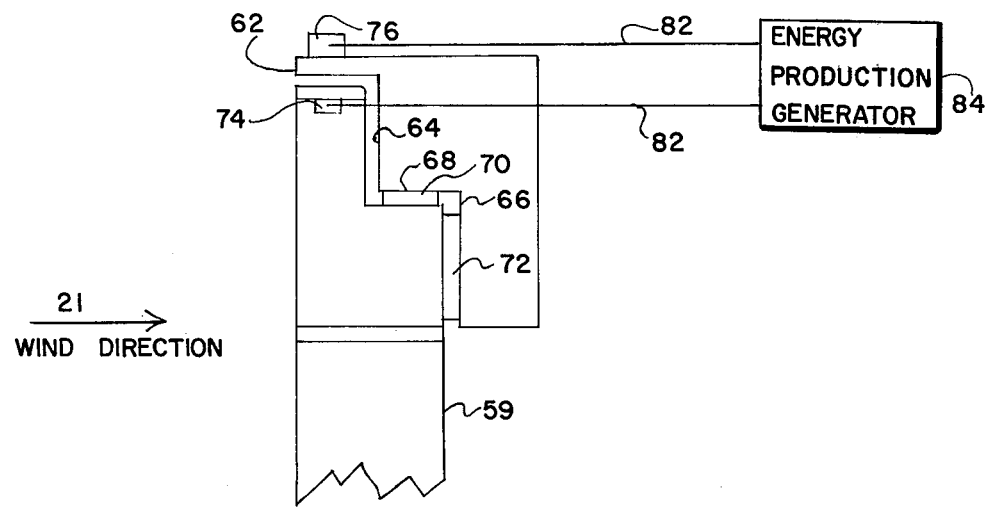
FIG. 7 is a close-up view of the outer portion of the fan blade and fan circumference.

As set forth in FIG. 7, the energy generated from rotors 78 and stators 80 is carried through power lines 82 to energy production generator 84.

The fan blades 59 may be feathered to prevent damage in high winds.

The illustrated embodiment can be varied within the scope of the invention. In particular, it is possible to vary the shape of the modified venturi wall configuration and conicle deflector. Also, the positioning of the baffles may be changed in order to take best advantage of prevailing winds in any given location. The feature of the energy system is its versatility and adaptability to different wind conditions.

Although, a particular embodiment of the invention has been disclosed above for illustrative purposes, it will be understood that variations of modifications thereof which live within the scope of the appended claims are comtemplated. Embodiments of the inventions in which an exclusive property or privilege is claimed are defined as follows:

We claim:

1. A wind driven energy system comprising:
   a wind chamber;
   two apertures, one on each side of said wind chamber to permit flow there-through;
   two fan-shaped windwheels placed within said wind chamber;
   a venturi-shaped chamber placed within said wind chamber and opening on said apertures wherein said venturi shaped chamber expands in diameter after said first fan-shaped windwheel to a larger diameter when it meets said second fan-shaped windwheel;
   a conical deflector which progressively widens as it approaches said first fan-shaped windwheel whereupon it decreases in diameter until it meets the second fan-shaped windwheel;
   a series of baffles exterior to said wind chamber; and
   a means of producing electrical energy from said fan-shaped windwheels.

2. A wind driven energy system comprising:
   a wind chamber;
   two apertures, one on each side of said wind chamber to permit flow there-through;
   a hub placed within said wind chamber;
   a series of blades which are notched at their outer tips, said blades attached to said hub;
   two channels formed in a surface portion of said wind chamber which interface with said notched fan blades;
   a venturi-shaped chamber placed within said wind chamber which circumferences said channels and opens on said apertures;
   a series of baffles exterior to said wind chamber; and
   a means for producing electrical energy from said blades.

3. The wind driven energy system of claim 2 further comprising:
   rollers located in said channels which interface said notched fan blades.

4. A wind concentrating system exterior to a wind chamber comprising a wind chamber, a fan-shaped windwheel within said chamber, a means for producing electrical energy from said fan-shaped windwheel, a series of baffles positioned to concentrate the incoming wind at the wind chamber, said baffles having upper and lower arms, said lower arm protruding from the side of said baffles at a greater angle than said upper arm affixed to the top of each of said baffles.

5. The wind concentrating system of claim 4 wherein said upper arm has a final deflection angle closely paralleling the ground upon which said baffle is affixed.

6. The wind concentrating system of claim 4 further comprising:
   a movable diversion wall located in front of said wind chamber.

* * * * *